United States Patent
Natanzon et al.

(10) Patent No.: US 11,397,705 B2
(45) Date of Patent: Jul. 26, 2022

(54) STORAGE SYSTEM CONFIGURED TO GENERATE SUB-VOLUME SNAPSHOTS

(71) Applicant: EMC IP Holding Company LLC, Hopkinton, MA (US)

(72) Inventors: Assaf Natanzon, Tel Aviv (IL); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 151 days.

(21) Appl. No.: 16/285,377

(22) Filed: Feb. 26, 2019

(65) Prior Publication Data
US 2020/0272600 A1 Aug. 27, 2020

(51) Int. Cl.
*G06F 16/11* (2019.01)
*G06F 3/06* (2006.01)

(52) U.S. Cl.
CPC .......... *G06F 16/128* (2019.01); *G06F 3/0604* (2013.01); *G06F 3/0644* (2013.01); *G06F 3/0679* (2013.01)

(58) Field of Classification Search
CPC .... G06F 16/128; G06F 3/0604; G06F 3/0679; G06F 3/0644; G06F 2201/815; G06F 2201/84; G06F 11/1451; G06F 3/0608; G06F 3/065; G06F 3/0683
See application file for complete search history.

(56) References Cited

U.S. PATENT DOCUMENTS

| | | | |
|---|---|---|---|
| 7,444,464 B2 | 10/2008 | Urmston et al. |
| 8,095,726 B1 | 1/2012 | O'Connell et al. |
| 8,214,612 B1 | 7/2012 | Natanzon |
| 9,104,326 B2 | 8/2015 | Frank et al. |
| 9,208,162 B1 | 12/2015 | Hallak et al. |

(Continued)

FOREIGN PATENT DOCUMENTS

WO 2016111954 A1 7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — William B Partridge
*Assistant Examiner* — Aryan D Toughiry
(74) *Attorney, Agent, or Firm* — Ryan, Mason & Lewis, LLP (57) ABSTRACT

A method includes designating one or more particular portions of a storage volume of a storage system for inclusion in a sub-volume snapshot. The method further includes generating the sub-volume snapshot as a point-in-time copy that includes the one or more designated portions of the storage volume and excludes one or more non-designated portions of the storage volume. The method is performed by at least one processing device comprising a processor coupled to a memory. The storage volume illustratively comprises a logical unit of a virtual machine file system, with the one or more designated portions of the logical unit (Continued)

of the virtual machine file system illustratively comprising at least one virtual machine storage drive file of the virtual machine file system. In some embodiments, a bitmap or other data structure is maintained for the storage volume with particular entries in the data structure corresponding to respective ones of the portions.

20 Claims, 6 Drawing Sheets

(56) References Cited

U.S. PATENT DOCUMENTS

| | | | |
|---|---|---|---|
| 9,286,003 B1 | 3/2016 | Hallak et al. | |
| 9,552,258 B2 | 1/2017 | Hallak et al. | |
| 9,606,870 B1 | 3/2017 | Meiri et al. | |
| 9,716,754 B2 | 7/2017 | Swift | |
| 2005/0004979 A1* | 1/2005 | Berkowitz | G06F 11/2097 709/203 |
| 2008/0082593 A1* | 4/2008 | Komarov | G06F 11/1451 |
| 2008/0279462 A1 | 11/2008 | Celi, Jr. | |
| 2009/0132955 A1 | 5/2009 | Garg et al. | |
| 2010/0179941 A1 | 7/2010 | Agrawal et al. | |
| 2013/0325824 A1 | 12/2013 | Shoens | |
| 2014/0181016 A1 | 6/2014 | Whitehead et al. | |
| 2016/0019002 A1* | 1/2016 | Kurtin | G06F 3/0665 711/162 |
| 2016/0147472 A1* | 5/2016 | Littlefield | G06F 3/0619 711/162 |
| 2016/0150012 A1 | 5/2016 | Barszczak et al. | |
| 2016/0170987 A1 | 6/2016 | Kesselman | |
| 2016/0202927 A1 | 7/2016 | Klarakis et al. | |
| 2016/0224259 A1 | 8/2016 | Ahrens et al. | |
| 2016/0357769 A1* | 12/2016 | Bushman | G06F 16/128 |
| 2017/0192857 A1 | 7/2017 | Meiri et al. | |
| 2020/0065399 A1* | 2/2020 | Desai | G06F 16/2246 |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

* cited by examiner

STORAGE SYSTEM CONFIGURED TO GENERATE SUB-VOLUME SNAPSHOTS

FIELD

The field relates generally to information processing systems, and more particularly to storage in information processing systems.

BACKGROUND

In many storage systems, it is desirable to generate periodic snapshots of storage volumes. A given such snapshot illustratively represents a point-in-time replica of a particular storage volume of the storage system. Such snapshots are commonly used in a wide variety of different data protection scenarios. For example, periodic snapshots are created in a storage system in order to enable users to recover from data corruption by restoring one or more storage volumes using a previous point-in-time replica. As another example, snapshots may be used in conjunction with synchronous or asynchronous replication of data from a storage system at one site to a storage system at another site, in order to support disaster recovery functionality. Conventional snapshot generation arrangements typically involve the use of a snapshot scheduler that is configured to create periodic snapshots at fixed intervals, following a predetermined schedule. For example, the snapshot scheduler can cause a snapshot of a given storage volume to be created every hour, or at a particular time every day. In these and other conventional arrangements, the snapshots are generally created for full storage volumes. Such arrangements can be problematic in that excessive amounts of storage resources and processing overhead are often consumed in generating and storing the full-volume snapshots.

SUMMARY

Illustrative embodiments provide techniques for generation of sub-volume snapshots in a storage array or other type of storage system. For example, one or more such embodiments can be advantageously configured to control generation of sub-volume snapshots for a given storage volume of the storage system in a manner that reduces the amount of storage space consumed by the snapshots while still providing desired levels of protection.

Such arrangements are particularly useful in the context of virtual machine file systems in which excessive amounts of storage resources and processing overhead might otherwise be consumed by using full-volume snapshots, but also find advantageous application in numerous other storage system contexts.

In one embodiment, a method comprises designating one or more particular portions of a storage volume of a storage system for inclusion in a sub-volume snapshot. The method further comprises generating the sub-volume snapshot as a point-in-time copy that includes the one or more designated portions of the storage volume and excludes one or more non-designated portions of the storage volume.

The method is performed by at least one processing device comprising a processor coupled to a memory. For example, the method in some embodiments can be performed by a storage controller of the storage system, a host device coupled to the storage system, or by cooperative interaction of the storage controller and the host device.

The storage volume illustratively comprises at least one logical storage volume comprising at least a portion of a physical storage space of one or more of the storage devices. The term "storage volume" as used herein is therefore intended to be broadly construed, so as to encompass a set of one or more logical storage volumes.

For example, the storage volume in some embodiments comprises a single logical unit (LUN) of the storage system.

As a more particular example, the storage volume illustratively comprises a LUN of a virtual machine file system, with the one or more designated portions of the LUN of the virtual machine file system illustratively comprising at least one virtual machine storage drive file of the LUN of the virtual machine file system. The one or more non-designated portions of the LUN of the virtual machine file system illustratively comprise at least one file of the LUN of the virtual machine file system other than a virtual machine storage drive file. Illustrative embodiments therefore allow sub-LUN snapshots to be generated for one or more designated virtual machine storage drive files of a virtual machine file system LUN without the excessive amounts of storage resources and processing overhead would otherwise be consumed by using full-volume snapshots of the virtual machine file system LUN.

In some embodiments, a bitmap or other data structure is maintained for the storage volume with particular entries in the data structure corresponding to respective ones of the portions of the storage volume. For example, a given one of the entries in the data structure having a first value indicates that the corresponding one of the portions of the storage volume is designated for inclusion in the sub-volume snapshot. Similarly, the given one of the entries in the data structure having a second value different than the first value indicates that the corresponding one of the portions of the storage volume is not designated for inclusion in the sub-volume snapshot. Other types of data structures can be used in other embodiments.

The generation of the sub-volume snapshot in some embodiments more particularly comprises generating a full-volume snapshot of the storage volume, determining the one or more designated portions of the storage volume to be included in the sub-volume snapshot, and configuring the sub-volume snapshot by populating entries of a data structure maintained for the storage volume such that the one or more designated portions are retained from the full-volume snapshot as the sub-volume snapshot and the one or more non-designated portions are not retained from the full-volume snapshot.

Determining the one or more designated portions of the storage volume to be included in the sub-volume snapshot in some embodiments comprises mounting a file system for the storage volume on a host device, parsing file system metadata for the storage volume on the host device to identify the one or more designated portions of the storage volume to be included in the sub-volume snapshot, and communicating information identifying the one or more designated portions from the host device to the storage system.

The storage system illustratively retains only the sub-volume snapshot and not the full-volume snapshot subsequent to the generation of the sub-volume snapshot. The sub-volume snapshot retained by the storage system is illustratively utilized to recover from a failure in at least one of the one or more designated portions of the storage volume.

The storage system in some embodiments comprises a content addressable storage system implemented utilizing non-volatile memory storage devices, such as flash-based storage devices. For example, the storage devices of the storage system in such embodiments can be configured to collectively provide an all-flash storage array. Numerous other storage system arrangements are possible in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
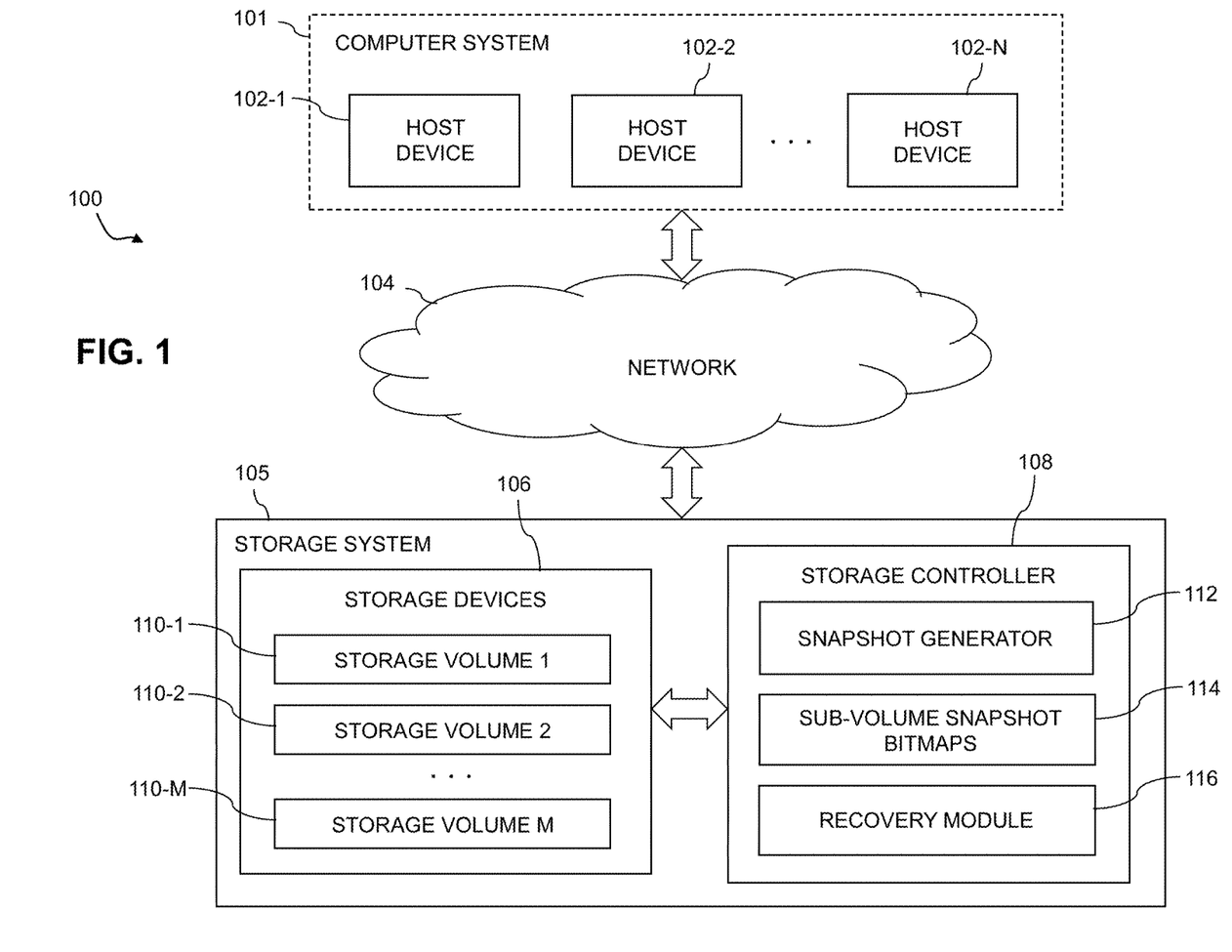
FIG. 1 is a block diagram of an information processing system comprising a storage system configured to generate sub-volume snapshots in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102 and storage system 105 illustratively comprise respective processing devices of one or more processing platforms. For example, the host devices 102 and the storage system 105 can each comprise one or more processing devices each having a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of storage devices 106 and an associated storage controller 108. The storage devices 106 store storage volumes 110-1, 110-2, . . . 110-M. The storage volumes 110 illustratively comprise respective logical units (LUNs) or other types of logical storage volumes.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives or other types of SSDs, hard disk drives (HDDs), hybrid drives or other types of storage devices.

In some embodiments, the storage system 105 illustratively comprises a scale-out all-flash content addressable storage array such as an XtremIO™ storage array from Dell EMC of Hopkinton, Mass.

For example, the storage system 105 can comprise an XtremIO™ storage array or other type of content addressable storage system suitably modified to incorporate sub-volume snapshot generation techniques as disclosed herein. The content addressable storage system in such an embodiment is illustratively implemented as a clustered storage system and includes a plurality of storage nodes each comprising a corresponding subset of the storage devices 106. Each of the storage nodes is assumed to be implemented using at least one processing device comprising a processor coupled to a memory. The storage controller of the content addressable storage system is also implemented in a distributed manner so as to comprise a plurality of distributed storage controller components implemented on respective ones of the storage nodes. Such a storage controller is also referred to herein as a "distributed storage controller." Communication links may be established between components of a distributed storage controller using well-known communication protocols such as IP, Transmission Control Protocol (TCP), and remote direct memory access (RDMA).

Other types of storage arrays, including by way of example VNX® and Symmetrix VMAX® storage arrays also from Dell EMC, can be used to implement storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage controller 108 of storage system 105 in the FIG. 1 embodiment includes a snapshot generator 112, sub-volume snapshot bitmaps 114 and a recovery module 116. The snapshot generator 112, sub-volume snapshot bitmaps 114 and recovery module 116 are collectively configured to implement corresponding portions of a sub-volume snapshot process such as that illustrated in the flow diagram of FIG. 2.

The storage controller 108 and storage system 105 should also be understood to include additional modules and other components typically found in conventional implementations of storage controllers and storage systems, although such additional modules and other components are omitted from the figure for clarity and simplicity of illustration.

The storage controller 108 via its snapshot generator 112 and sub-volume snapshot bitmaps 114 is configured to designate one or more particular portions of a given one of the storage volumes 110 of storage system 105 for inclusion in a sub-volume snapshot, and to generate the sub-volume snapshot as a point-in-time copy of the storage volume that includes the one or more designated portions of the storage volume and excludes one or more non-designated portions of the storage volume. In some embodiments, the storage volume comprises a particular LUN of the storage system 105, and the sub-volume snapshot in such embodiments is also referred to herein as a sub-LUN snapshot.

Although the designation and generation operations are illustratively performed by the storage controller 108 in some embodiments, other embodiments can involve one or more of the host devices 102 in at least one of these operations. Accordingly, some embodiments involve cooperative interaction of the storage controller 108 and a given one of the host devices 102 in generating a sub-volume snapshot. For example, the designation operation can be performed at least in part by a host device in an application-aware manner to be described in more detail elsewhere herein, while the generation operation can be performed at least in part by the storage system populating entries of a corresponding one of the bitmaps 114. Numerous other arrangements of the designation and generation operations are possible. Terms such as "generating a sub-volume snapshot" as used herein are therefore intended to be broadly construed, so as to encompass various arrangements in which at least one of a storage controller and a host device perform operations to provide such a snapshot.

The system 100 can be configured such that sub-volume snapshots are generated for respective ones of the storage volumes 110, or for respective ones of a subset of the storage volumes 110.

In some embodiments, a particular one of the storage volumes 110 for which a sub-volume snapshot is generated in the system 100 comprises a LUN of a virtual machine file system (VMFS). For example, the one or more designated portions of the LUN of the VMFS to be included in the sub-LUN snapshot illustratively comprise at least one virtual machine storage drive file of the LUN of the VMFS. Such a virtual machine storage drive file in some embodiments is more particularly referred to as a virtual machine disk (VMDK) file, or as a virtual hard disk (VHD) file. These and other references to "disks" herein are intended to be broadly construed, and are not limited to HDDs or other rotational media. The one or more non-designated portions of the LUN of the VMFS illustratively comprise at least one file of the LUN of the VMFS other than a virtual machine storage drive file.

Such arrangements allow sub-LUN snapshots to be generated, for example, for only one or more designated VMDK files of a particular LUN of the VMFS, thereby reducing the amount of storage space consumed by the snapshots while still providing desired levels of protection. More particularly, the use of sub-LUN snapshots of this type avoids excessive amounts of storage resources and processing overhead that would otherwise be consumed by using snapshots of the full VMFS LUN.

In some embodiments, the VMFS more particularly comprises a VMware® VMFS of the type utilized in VMware® ESX server software to store files in a virtualized environment. The VMware® VMFS is designed to store files within a virtual machine. Multiple virtual machines can share a single VMFS. Other types of VMFS implementations can be used in other embodiments.

The VMware® ESX server software is an example of an application that may be running on one or more of the host devices 102. The VMware® ESX server software illustratively stores numerous VMDK files within the VMFS. Although the VMFS supports snapshots, such snapshots are at the full-volume level, and therefore inefficient for the reasons previously described. Illustrative embodiments overcome this limitation by providing functionality for generation of sub-volume snapshots, such as a snapshot comprising only one or more designated VMDK files within a potentially much larger full VMFS LUN.

Similar advantages are provided in other embodiments using other types of storage volumes utilized by other applications. For example, an Oracle database application or other type of database application running on one or more of the host devices 102 may be configured to manage multiple distinct types of objects within a single LUN of a file system. Illustrative embodiments allow sub-LUN snapshots to be generated for one or more designated objects within the single LUN, thereby conserving storage resources. For example, sub-LUN snapshots may be generated in illustrative embodiments for particular designated log files, database files or other objects of a particular type within a given LUN. Any remaining objects that are part of the same LUN managed within the same file system of the database application are not designated and therefore not part of the sub-LUN snapshot.

Illustrative embodiments therefore provide "application-aware" sub-volume snapshots, in that different types of files or other objects can be designated for inclusion in different sub-volume snapshots for different storage volumes utilized by different applications, such as the example VMFS and database applications described above. The configuration of the sub-volume snapshots can therefore vary from application to application.

The sub-volume snapshot bitmaps 114 illustratively comprise a separate bitmap for each of the storage volumes 110 for which a sub-volume snapshot is generated in the system 100. The sub-volume snapshot bitmaps 114 are examples of what are more generally referred to as "data structures" maintained for corresponding ones of the storage volumes 110 by the storage controller 108. A particular one of the bitmaps maintained for a corresponding one of the storage volumes 110 illustratively comprises a plurality of entries corresponding to respective ones of the portions of that storage volume.

Each entry in such a bitmap illustratively stores a single bit indicating whether or not the corresponding portion of the storage volume is included in the sub-volume snapshot. Accordingly, a given one of the entries in the bitmap having a first value (e.g., a logic one value) indicates that the corresponding one of the portions of the storage volume is designated for inclusion in the sub-volume snapshot. Similarly, the given one of the entries in the bitmap having a second value (e.g., a logic zero value) indicates that the corresponding one of the portions of the storage volume is not designated for inclusion in the sub-volume snapshot. Numerous other types of data structures, entries and values can be used in other embodiments.

In some embodiments, the portions of the storage volume comprise respective fixed-size blocks and the particular entries in the data structure correspond to respective ones of the fixed-size blocks, although numerous other arrangements are possible. Accordingly, the portions of the storage volume in other embodiments can comprise various combinations of blocks of different or variable sizes.

The generation of the sub-volume snapshot for a particular one of the storage volumes 110 in some embodiments is based at least in part on a corresponding full-volume snapshot generated for that storage volume by the snapshot generator 112 of the storage controller 108. The snapshot generator 112 in such embodiments is therefore configured to generate full-volume snapshots and also to utilize the full-volume snapshots and corresponding ones of the bitmaps 114 in generating sub-volume snapshots.

For example, generating a sub-volume snapshot for a particular one of the storage volumes 110 in some embodiments more particularly comprises generating a full-volume snapshot of the storage volume, and determining the one or more designated portions of the storage volume to be included in the sub-volume snapshot. The sub-volume snapshot is then configured by populating entries of a data structure maintained for the storage volume such that the one or more designated portions are retained from the full-volume snapshot as the sub-volume snapshot and the one or more non-designated portions are not retained from the full-volume snapshot.

The sub-volume snapshot is therefore retained by the storage controller 108, while the remaining portions of the full-volume snapshot are not retained by the storage controller 108. As a result, the storage space that would otherwise be consumed in retaining the entire full-volume snapshot is considerably reduced by retaining only the sub-volume snapshot.

As mentioned previously, the storage system 105 and its storage controller 108 interact with one or more of the host devices 102 in generating sub-volume snapshots for respective ones of the storage volumes 110.

For example, in some embodiments the storage controller 108 interacts with a particular one of the host devices 102 in order to determine which portion or portions of a storage volume are to be included in its corresponding sub-volume snapshot. This can more particularly involve mounting a file system for the storage volume on the host device, and parsing file system metadata for the storage volume on the host device to identify the one or more designated portions of the storage volume to be included in the sub-volume snapshot. Information identifying the one or more designated portions is then communicated from the host device to the storage controller 108 over the network 104. This identifying information is then utilized by the storage controller 108 to populate the particular one of the bitmaps 114 corresponding to the storage volume in conjunction with generation of its sub-volume snapshot. Numerous other techniques can be used in generating sub-volume snapshots in other embodiments.

A given one of the sub-volume snapshots generated in the manner described above is illustratively utilized to recover from a failure in at least one of the one or more designated portions of the storage volume. For example, the recovery module 116 is illustratively configured to detect a failure in at least one of the one or more designated portions of the storage volume, and to utilize the corresponding portion or portions of the sub-volume snapshot to recover from the detected failure.

Multiple sub-volume snapshots can be generated over time for a given one of the storage volumes 110. The given storage volume designated for generation of sub-volume snapshots in the storage system 105 illustratively comprises a set of one or more LUNs or other instances of the storage volumes 110 of the storage system 105. Each such LUN or other storage volume illustratively comprises at least a portion of a physical storage space of one or more of the storage devices 106.

The storage system 105 is illustratively configured to store the sub-volume snapshots for the storage volume in a tree structure in which the sub-volume snapshots are designated as collectively comprising a sub-volume snapshot group. The term "snapshot group" as used herein is intended to be broadly construed so as to encompass a set of snapshots generated over time for a particular storage volume or set of storage volumes. Individual sub-volume snapshots of the snapshot group illustratively correspond to respective point-in-time replicas of one or more designated portions of the storage volume.

A given such tree structure illustratively stores at least one snapshot group comprising a plurality of snapshots having parent-child relationships and other types of ancestor relationships.

For example, a given snapshot may be designated as a child snapshot of the snapshot group in the tree structure relative to a previous snapshot which is designated as a parent snapshot of the snapshot group in the tree structure.

In some embodiments, the tree structure utilized to store the snapshots for a snapshot group comprises a snapshot tree constructed for the storage volume.

Other types of tree structures implemented using a wide variety of alternative data structures such as tables can be used to store information characterizing snapshots of a snapshot group in other embodiments.

In some embodiments, the recovery module 116 of the storage controller 108 is further configured to initiate restoration of the storage volume utilizing a selected one of the sub-volume snapshots.

Various automated actions may be taken in at least one of the host devices 102 and the storage system 105 based at least in part on snapshots generated in the manner described above. For example, the sub-volume snapshots are utilized in some embodiments to allow users of the storage system 105 to recover from data corruption by restoring one or more storage volumes using one or more sub-volume snapshots. Accordingly, one or more sub-volume snapshots can be used to support automated rollback of a storage volume or set of storage volumes to a previous point in time.

As another example, sub-volume snapshots may be used in conjunction with synchronous or asynchronous replication of data from the storage system 105 at a production site or datacenter to another storage system at a recovery site or datacenter, in order to support disaster recovery functionality.

The above-described operations carried out in conjunction with a process for generation of sub-volume snapshots in the storage system 105 are illustratively performed at least in part under the control of the storage controller 108 utilizing its snapshot generator 112, sub-volume snapshot bitmaps 114 and recovery module 116.

The host devices 102 and storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 102, network 104, storage system 105, storage devices 106, storage controller 108 and storage volumes 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, functionality for generation of sub-volume snapshots can be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

The operation of the information processing system 100 will now be described in further detail with reference to the flow diagram of the illustrative embodiment of FIG. 2. The process as shown includes steps 200 through 210, and is suitable for use in system 100 but is more generally applicable to other types of information processing systems in which a storage system is configured to generate sub-volume snapshots for one or more storage volumes and to take one or more automated actions based at least in part on the generated sub-volume snapshots. The steps are illustratively performed at least in part under the control of the snapshot generator 112, sub-volume snapshot bitmaps 114 and recovery module 116 in the storage controller 108 of storage system 105 in system 100.

In step 200, one or more portions of a particular identified storage volume are designated for inclusion in a sub-volume snapshot to be generated for that storage volume. The identified storage volume is illustratively one of a plurality of logical storage volumes stored in the storage system, such as one of the storage volumes 110 of storage system 105. Multiple storage volumes can be identified for sub-volume snapshot generation in step 200. For example, one or more sets of storage volumes each comprising a plurality of storage volumes can be identified. It will be assumed for clarity and simplicity of the following description that a single storage volume is identified, but the techniques described can be extended in a straightforward manner to multiple storage volumes as well as multiple sets of storage volumes.

In step 202, a full-volume snapshot of the storage volume is generated at a designated point in time, possibly in accordance with a predetermined schedule previously established for the storage volume. For example, the predetermined schedule may provide that snapshots are taken at each of a plurality of recurring intervals so as to produce a sequence of regularly-spaced snapshots over time. Such snapshots are illustratively generated utilizing a snapshot generator such as snapshot generator 112 in the storage controller 108. The storage system determines the particular ones of the snapshots of the sequence to retain in accordance with a snapshot retention policy and deletes any of the snapshots that are not retained.

In step 204, a sub-volume snapshot is configured for the storage volume by populating entries of a bitmap or other type of data structure maintained for the storage volume in the manner previously described. The entries of the bitmap or other data structure are populated in a manner that ensures that the one or more designated portions are retained from the full-volume snapshot as the sub-volume snapshot and that one or more non-designated portions are not retained from the full-volume snapshot.

In step 206, the sub-volume snapshot continues to be retained in the storage system. The remaining non-designated portions of the corresponding full-volume snapshot are not retained, thereby conserving storage space within the storage system.

In step 208, a determination is made as to whether or not any failure is detected in a portion or portions of the storage volume included in the sub-volume snapshot. If such a failure is detected, the process moves to step 210, and otherwise returns to step 206.

In step 210, the sub-volume snapshot is utilized to recover from the detected failure.

Although not explicitly illustrated in the figure, additional sub-volume snapshots can be generated for the storage volume over time, possibly by repeating steps 202, 204 and 206 at regular specified intervals.

One or more previously-generated sub-volume snapshots of the storage volume may be deleted as one or more newer sub-volume snapshots are generated for the storage volume, in accordance with a snapshot retention policy.

Figure 2:
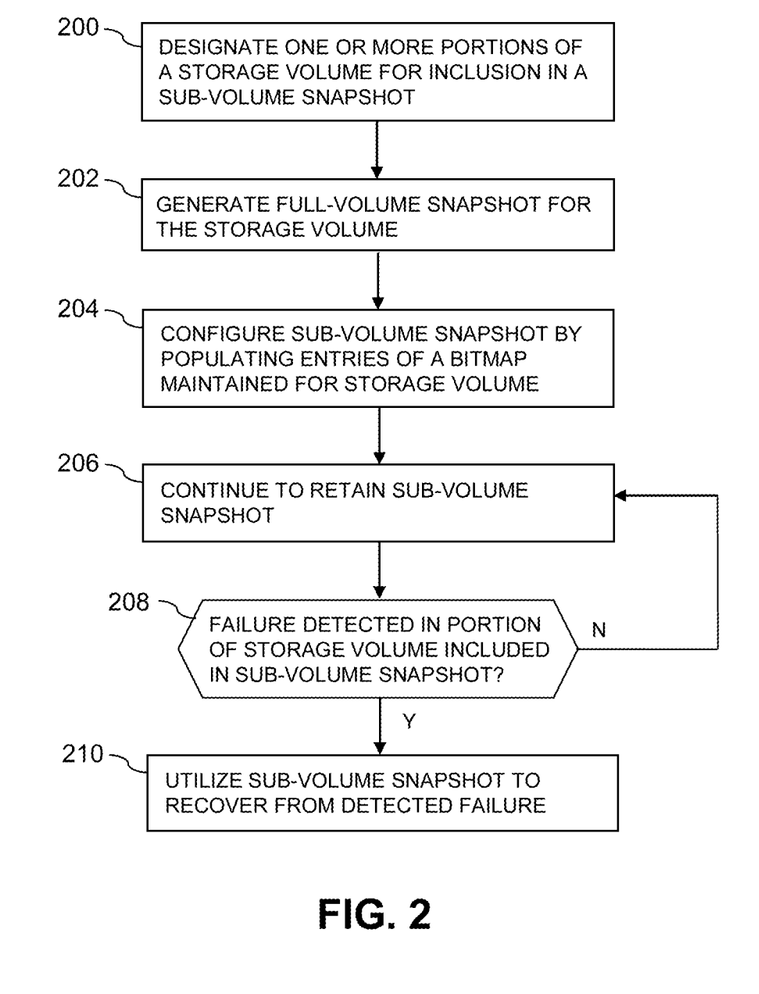
FIG. 2 is a flow diagram of a process for generation of sub-volume snapshots in an illustrative embodiment.

The FIG. 2 process can be terminated under various conditions, possibly by or under the control of the storage controller 108, such as a change in the designation previously made in step 200, a remapping, rezoning or other reconfiguration of the identified storage volume, or deletion of the identified storage volume.

The sub-volume snapshots generated by a given storage system in conjunction with the FIG. 2 process may be utilized to perform one or more automated actions in the storage system. For example, the storage system may utilize one or more sub-volume snapshots to support automated rollback of the one or more designated portions of the storage volume to a previous point in time, or to support synchronous or asynchronous replication of the one or more designated portions of the storage volume from the storage system to another storage system or to another portion of the same storage system. These and numerous other automated actions may be taken utilizing sub-volume snapshots generated for a particular storage volume in a given storage system in conjunction with the FIG. 2 process.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for generation of sub-volume snapshots and for utilization of such sub-volume snapshots in performing failure recovery or other automated actions. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different sub-volume snapshot generation processes for respective different sets of one or more storage volumes or for different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 of storage system 105 that is configured to control performance of one or more steps of the FIG. 2 process in the system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controller 108, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

Additional illustrative embodiments will now be described with reference to FIGS. 3 and 4, which show examples of LUNs and sub-LUN snapshots generated from those LUNs using the techniques disclosed herein.

Figure 3:
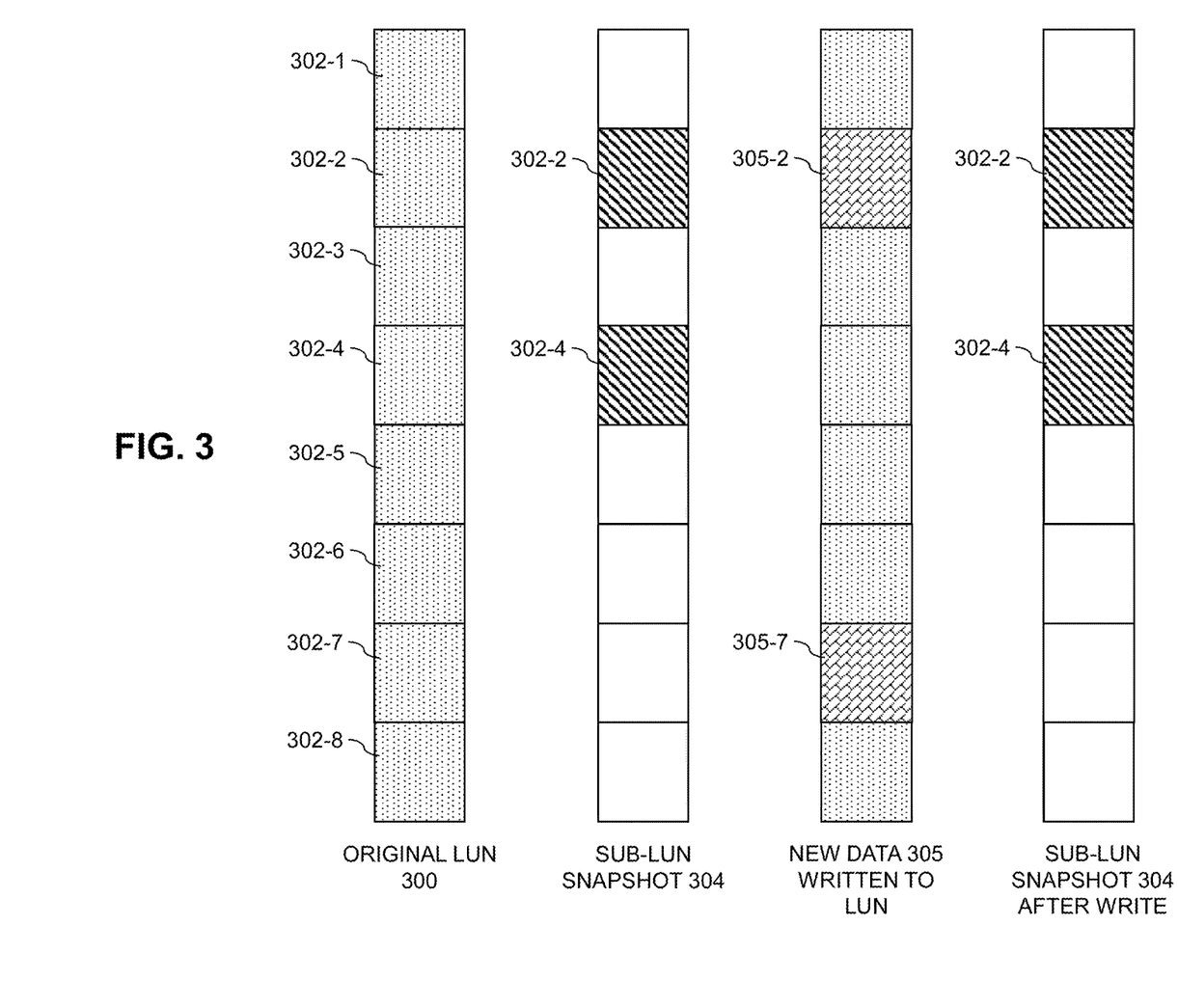
FIGS. 3 and 4 show examples of sub-volume snapshots in illustrative embodiments.

Referring initially to FIG. 3, an original LUN 300 shown in the first column at the far left side of the figure comprises a plurality of portions 302-1 through 302-8 as shown. Particular portions of the original LUN 300 are designated for inclusion in a sub-LUN snapshot 304 of the original LUN 300. These particular portions as shown in the second column of the figure include portions 302-2 and 302-4. The sub-LUN snapshot 304 is generated in this embodiment as a point-in-time copy that includes the one or more designated portions 302-2 and 302-4 of the original LUN 300 and excludes the non-designated portions 302-1, 302-3, 302-5, 302-6, 302-7 and 302-8 of the original LUN 300.

The sub-LUN snapshot 304 remains unchanged even if the designated portions are changed in the original LUN 300. For example, the third column of the figure illustrates new data 305 being written to the original LUN 300 to produce an updated LUN in which portions 302-2 and 302-7 are overwritten with respective portions comprising new data 305-2 and 305-7. However, the sub-LUN 304 remains unchanged after the new data 305 is written, as illustrated in the fourth column at the far right side of the figure. Accordingly, the sub-LUN snapshot preserves the point-in-time copy of designated portions 302-2 and 302-4 of the original LUN 300.

The sub-LUN snapshot 304 is illustratively implemented at least in part by maintaining a bitmap or other data structure which indicates which blocks of the LUN are part of the sub-LUN snapshot 304. For example, if the basic block size of the storage system is 16 KB or 32 KB, the data structure includes entries for respective ones of the 16 KB or 32 KB blocks indicating whether or not the corresponding block is designated for inclusion in the sub-LUN snapshot 304. For any blocks that are not designated for inclusion, those blocks can be overwritten with new data, such as new data 305-7 in the FIG. 3 embodiment. A user accessing the corresponding offset of a given such non-designated block in the storage volume will therefore access the new data and not the data at the time of the snapshot. For any blocks that are designated for inclusion, those blocks cannot be overwritten with new data, such as new data 305-2 in the FIG. 3 embodiment. A user accessing the corresponding offset of a given such designated block in the storage volume will access the data at the time of the snapshot and not the new data. The new data directed to the designated block can be copied on write or redirected on write so as to not overwrite the designated block of the sub-LUN snapshot.

In this embodiment, the sub-LUN snapshot is illustratively generated using the following example process:

1. The storage system generates a full-volume snapshot of the LUN.
2. The file system of the LUN is mounted to a host device.
3. The host device analyzes file system metadata for the LUN to identify one or more designated portions of the LUN to be included in the sub-LUN snapshot. As mentioned previously, such identification can be done in an application-aware manner, such that it varies depending upon the type of application running on the host. The designation of particular portions can therefore be at least in part predetermined based on the application type.
4. The host device communicates information identifying the one or more designated portions from the host device to the storage system.
5. The storage system populates its bitmap for the sub-LUN snapshot using the information received from the host device. This effectively converts a full-LUN snapshot to a sub-LUN snapshot in the storage system.

The ordering and configuration of these and other process steps referred to herein can be varied in other embodiments.

In some embodiments, the host device modifies at least portions of the file system metadata. For example, it may modify the file system metadata to indicate that particular portions of the LUN are included in a sub-LUN snapshot, such as one or more VMDK files in the case of a VMFS LUN.

Figure 4:
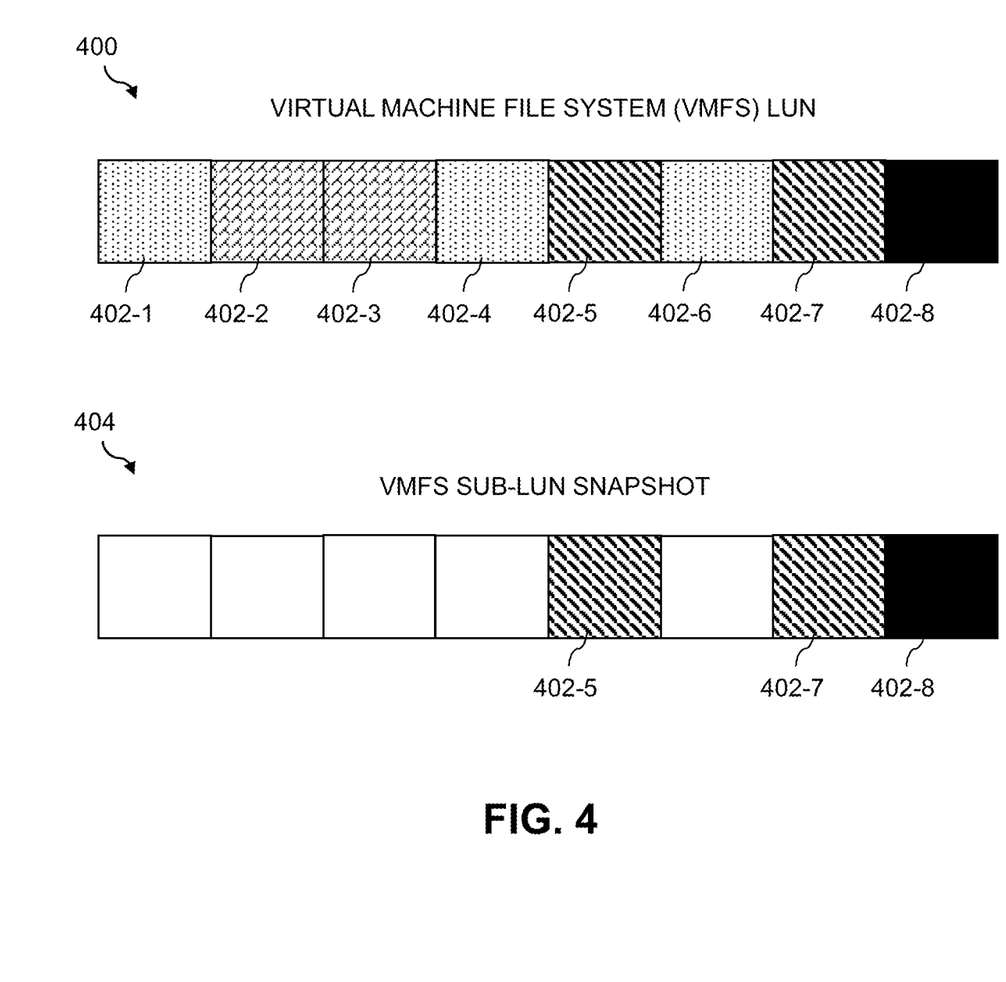

FIG. 4 shows an example of a VMFS LUN 400 and its corresponding sub-LUN snapshot in an illustrative embodiment. The VMFS LUN 400 in this embodiment comprises blocks 402-1 through 402-8 as shown. These LUN blocks 402 are examples of what are more generally referred to herein as respective "portions" of a storage volume.

The block 402-8 represents file system metadata for the VMFS LUN 400 and illustratively describes structure of the corresponding file system. This file system metadata indicates that the VMFS LUN 400 includes two distinct VMDK files, each comprising two blocks. More particularly, a first VMDK file comprises blocks 402-2 and 402-3, and a second VMDK file comprises blocks 402-5 and 402-7.

In the corresponding sub-LUN snapshot 404, the file system metadata in block 402-8 is illustratively modified to indicate that the sub-LUN snapshot 404 includes only a single VMDK file, namely, the second VMDK file comprising blocks 402-5 and 402-7. The remaining blocks of the VMFS LUN 400 are not designated as part of the sub-LUN snapshot 404.

The particular arrangements of blocks, file system metadata and other features of the LUNs and sub-LUN snapshots shown in FIGS. 3 and 4 are presented by way of example only, and can be varied in other embodiments.

As mentioned previously, sub-LUN snapshots of the type described above can be utilized in recovery of the corresponding portions of the LUN in the event of failures impacting those portions. For example, with reference to the FIG. 4 example, the single VMDK that is part of the sub-LUN snapshot 404 can be copied from the sub-LUN snapshot 404 into the storage volume responsive to a detected failure.

Illustrative embodiments of a storage system with sub-volume snapshot generation functionality as disclosed herein can provide a number of significant advantages relative to conventional arrangements.

For example, some embodiments are advantageously configured to control generation of sub-volume snapshots for a given storage volume of the storage system in a manner that reduces the amount of storage space that would otherwise be consumed by full-volume snapshots while still providing desired levels of protection.

Such arrangements are particularly useful in the context of virtual machine file systems in which excessive amounts of storage resources and processing overhead might otherwise be consumed by using full-volume snapshots, but also find advantageous application in numerous other storage system contexts.

Illustrative embodiments disclosed herein can considerably reduce the amounts of storage system computational and memory resources that are consumed in generating and storing snapshots, thereby leading to improved storage system performance.

Functionality for sub-volume snapshot generation and associated automated processing based at least in part on the resulting sub-volume snapshots can be implemented in a storage system, in a host device, or partially in a storage system and partially in a host device.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with sub-volume snapshot generation functionality will now be described in greater detail with reference to FIGS. 5 and 6. Although described in the context of system 100, these platforms may also be used to implement at least portions of other information processing systems in other embodiments.

Figure 5:
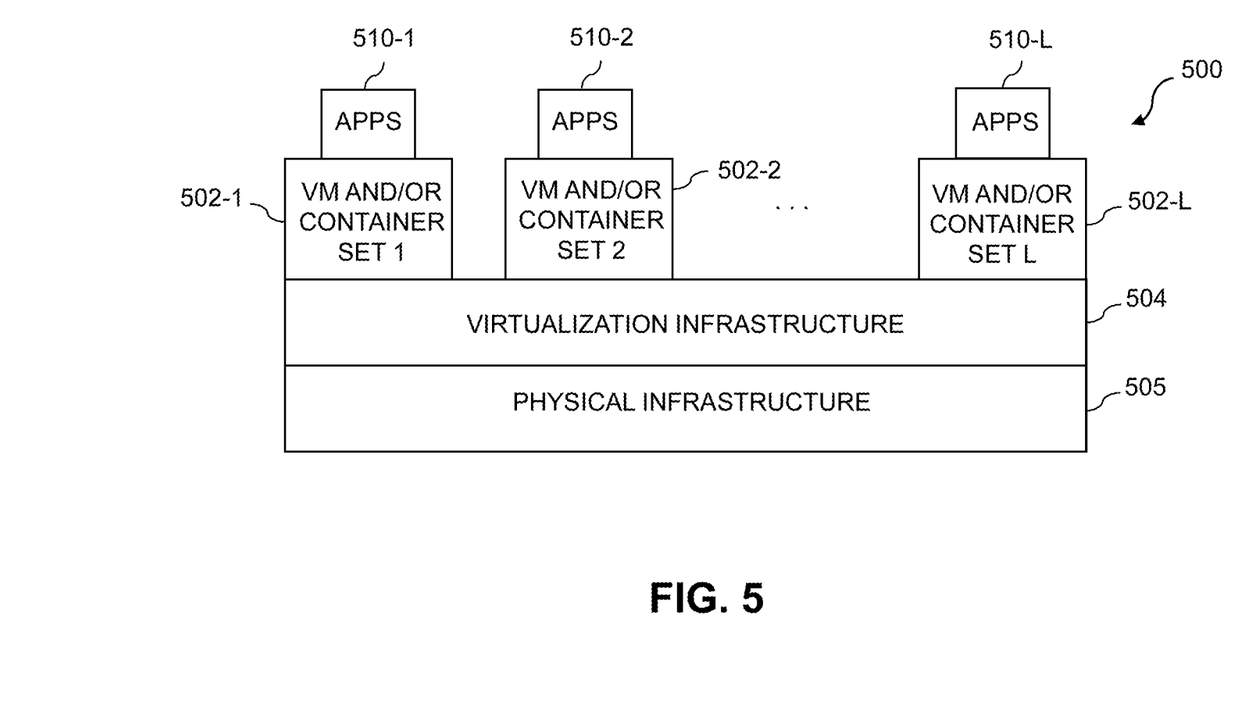
FIGS. 5 and 6 show examples of processing platforms that may be utilized to implement at least a portion of an information processing system in illustrative embodiments.
Figure 6:
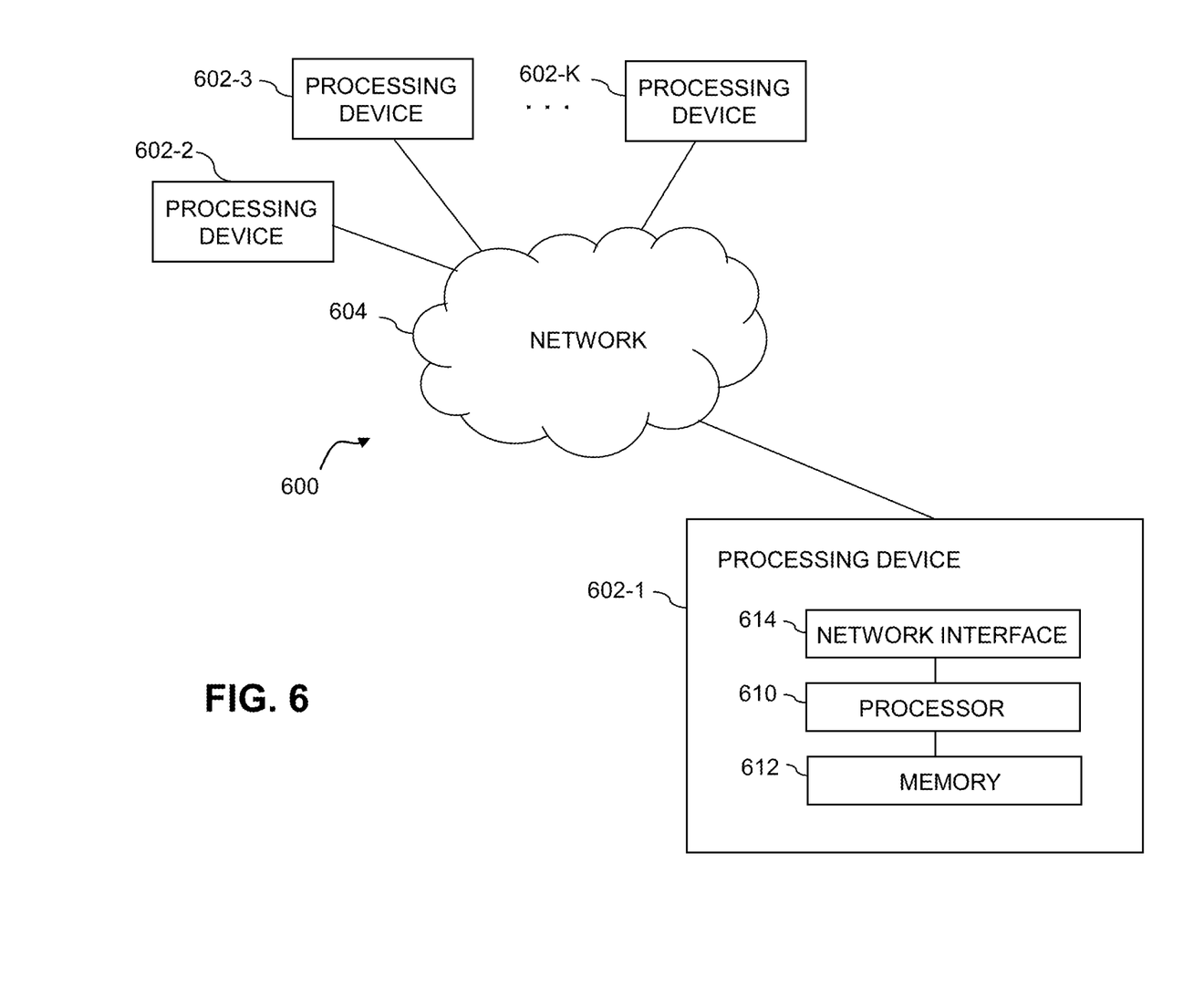

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide sub-volume snapshot generation functionality of the type described above for one or more processes running on a given one of the VMs. For example, the VMs can be used to implement sub-volume snapshot generation functionality in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide sub-volume snapshot generation functionality of the type described above. For example, a container host device supporting multiple containers of one or more container sets can implement sub-volume snapshot generation functionality in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the sub-volume snapshot generation functionality of one or more components of a storage system and/or a host device as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, sub-volume snapshot generation processes and associated bitmaps or other data structures. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    said at least one processing device being configured:
    to designate one or more particular portions of a storage volume of a storage system for inclusion in a sub-volume snapshot; and
    to generate the sub-volume snapshot as a point-in-time copy that includes the one or more designated portions of the storage volume and excludes one or more non-designated portions of the storage volume;
    wherein said at least one processing device is further configured to maintain a data structure for the storage volume with particular entries in the data structure corresponding to respective ones of the portions;
    wherein a given one of the entries in the data structure having a first value indicates that the corresponding one of the portions of the storage volume is designated for inclusion in the sub-volume snapshot and the given one of the entries in the data structure having a second value different than the first value indicates that the corresponding one of the portions of the storage volume is not designated for inclusion in the sub-volume snapshot;
    wherein generating the sub-volume snapshot comprises:
    generating a full-volume snapshot of the storage volume;
    determining the one or more designated portions of the storage volume to be included in the sub-volume snapshot; and
    configuring the sub-volume snapshot by populating entries of the data structure maintained for the storage volume such that the one or more designated portions are retained from the full-volume snapshot as the sub-volume snapshot and the one or more non-designated portions are not retained from the full-volume snapshot; and
    wherein determining the one or more designated portions of the storage volume to be included in the sub-volume snapshot comprises:
    mounting a file system for the storage volume on a host device;
    parsing file system metadata for the storage volume on the host device to identify the one or more designated portions of the storage volume to be included in the sub-volume snapshot; and
    communicating information identifying the one or more designated portions from the host device to the storage system.

2. The apparatus of claim 1 wherein the storage volume comprises at least one logical storage volume comprising at least a portion of a physical storage space of one or more of the storage devices.

3. The apparatus of claim 2 wherein the storage volume comprises a particular logical unit of the storage system.

4. The apparatus of claim 1 wherein the storage volume comprises a logical unit of a virtual machine file system.

5. The apparatus of claim 4 wherein the one or more designated portions of the logical unit of the virtual machine file system comprise at least one virtual machine storage drivefile of the logical unit of the virtual machine file system.

6. The apparatus of claim 4 wherein the one or more non-designated portions of the logical unit of the virtual machine file system comprise at least one file of the logical unit of the virtual machine file system other than a virtual machine storage drive file.

7. The apparatus of claim 1 wherein the data structure comprises a bitmap.

8. The apparatus of claim 1 wherein the portions of the storage volume comprise respective fixed-size blocks and the particular entries in the data structure correspond to respective ones of the fixed-size blocks.

9. The apparatus of claim 1 wherein said at least one processing device is further configured to utilize the sub-volume snapshot to recover from a failure in at least one of the one or more designated portions of the storage volume.

10. The apparatus of claim 1 wherein said at least one processing device comprises at least one of:
    a storage controller of the storage system; and
    a host device coupled to the storage system.

11. A method comprising:
    designating one or more particular portions of a storage volume of a storage system for inclusion in a sub-volume snapshot; and
    generating the sub-volume snapshot as a point-in-time copy that includes the one or more designated portions of the storage volume and excludes one or more non-designated portions of the storage volume;
    wherein the method further comprises maintaining a data structure for the storage volume with particular entries in the data structure corresponding to respective ones of the portions;
    wherein a given one of the entries in the data structure having a first value indicates that the corresponding one of the portions of the storage volume is designated for inclusion in the sub-volume snapshot and the given one of the entries in the data structure having a second value different than the first value indicates that the corresponding one of the portions of the storage volume is not designated for inclusion in the sub-volume snapshot;

wherein generating the sub-volume snapshot comprises:
generating a full-volume snapshot of the storage volume;
determining the one or more designated portions of the storage volume to be included in the sub-volume snapshot; and
configuring the sub-volume snapshot by populating entries of the data structure maintained for the storage volume such that the one or more designated portions are retained from the full-volume snapshot as the sub-volume snapshot and the one or more non-designated portions are not retained from the full-volume snapshot;
wherein determining the one or more designated portions of the storage volume to be included in the sub-volume snapshot comprises:
mounting a file system for the storage volume on a host device;
parsing file system metadata for the storage volume on the host device to identify the one or more designated portions of the storage volume to be included in the sub-volume snapshot; and
communicating information identifying the one or more designated portions from the host device to the storage system; and
wherein the method is implemented by at least one processing device comprising a processor coupled to a memory.

12. The method of claim 11 wherein the storage volume comprises a logical unit of a virtual machine file system and further wherein the one or more designated portions of the logical unit of the virtual machine file system comprise at least one virtual machine storage drive file of the virtual machine file system.

13. A computer program product comprising a non-transitory processor-readable storage medium having stored therein program code of one or more software programs, wherein the program code when executed by at least one processing device causes said at least one processing device:
to designate one or more particular portions of a storage volume of the storage system for inclusion in a sub-volume snapshot; and
to generate the sub-volume snapshot as a point-in-time copy that includes the one or more designated portions of the storage volume and excludes one or more non-designated portions of the storage volume;
wherein the program code when executed by the at least one processing device further causes said at least one processing device to maintain a data structure for the storage volume with particular entries in the data structure corresponding to respective ones of the portions;
wherein a given one of the entries in the data structure having a first value indicates that the corresponding one of the portions of the storage volume is designated for inclusion in the sub-volume snapshot and the given one of the entries in the data structure having a second value different than the first value indicates that the corresponding one of the portions of the storage volume is not designated for inclusion in the sub-volume snapshot;
wherein generating the sub-volume snapshot comprises:
generating a full-volume snapshot of the storage volume;
determining the one or more designated portions of the storage volume to be included in the sub-volume snapshot; and
configuring the sub-volume snapshot by populating entries of the data structure maintained for the storage volume such that the one or more designated portions are retained from the full-volume snapshot as the sub-volume snapshot and the one or more non-designated portions are not retained from the full-volume snapshot; and
wherein determining the one or more designated portions of the storage volume to be included in the sub-volume snapshot comprises:
mounting a file system for the storage volume on a host device;
parsing file system metadata for the storage volume on the host device to identify the one or more designated portions of the storage volume to be included in the sub-volume snapshot; and
communicating information identifying the one or more designated portions from the host device to the storage system.

14. The computer program product of claim 13 wherein the storage volume comprises a logical unit of a virtual machine file system and further wherein the one or more designated portions of the logical unit of the virtual machine file system comprise at least one virtual machine storage drive file of the virtual machine file system.

15. The computer program product of claim 13 wherein generating the sub-volume snapshot as the point-in-time copy comprises generating the point-in-time copy as a partial snapshot of the storage volume, determined based at least in part on the entries of the data structure, the partial snapshot including the designated portions of the storage volume and excluding the non-designated portions of the storage volume, such that the point-in-time copy is not a copy of the entire storage volume.

16. The method of claim 11 wherein generating the sub-volume snapshot as the point-in-time copy comprises generating the point-in-time copy as a partial snapshot of the storage volume, determined based at least in part on the entries of the data structure, the partial snapshot including the designated portions of the storage volume and excluding the non designated portions of the storage volume, such that the point-in-time copy is not a copy of the entire storage volume.

17. The apparatus of claim 1 wherein generating the sub-volume snapshot as the point-in-time copy comprises generating the point-in-time copy as a partial snapshot of the storage volume, determined based at least in part on the entries of the data structure, the partial snapshot including the designated portions of the storage volume and excluding the non designated portions of the storage volume, such that the point-in-time copy is not a copy of the entire storage volume.

18. The computer program product of claim 13 wherein said at least one processing device is further configured to utilize the sub-volume snapshot to recover from a failure in at least one of the one or more designated portions of the storage volume.

19. The computer program product of claim 13 wherein said at least one processing device comprises at least one of:
a storage controller of the storage system; and
a host device coupled to the storage system.

20. The method of claim 11 wherein said at least one processing device comprises at least one of:
a storage controller of the storage system; and
a host device coupled to the storage system.

* * * * *